Dec. 28, 1954  H. G. ELWELL, JR  2,698,408
AMBIGUITY ELIMINATOR FOR FOLLOW-UP SYSTEMS
Filed June 13, 1952
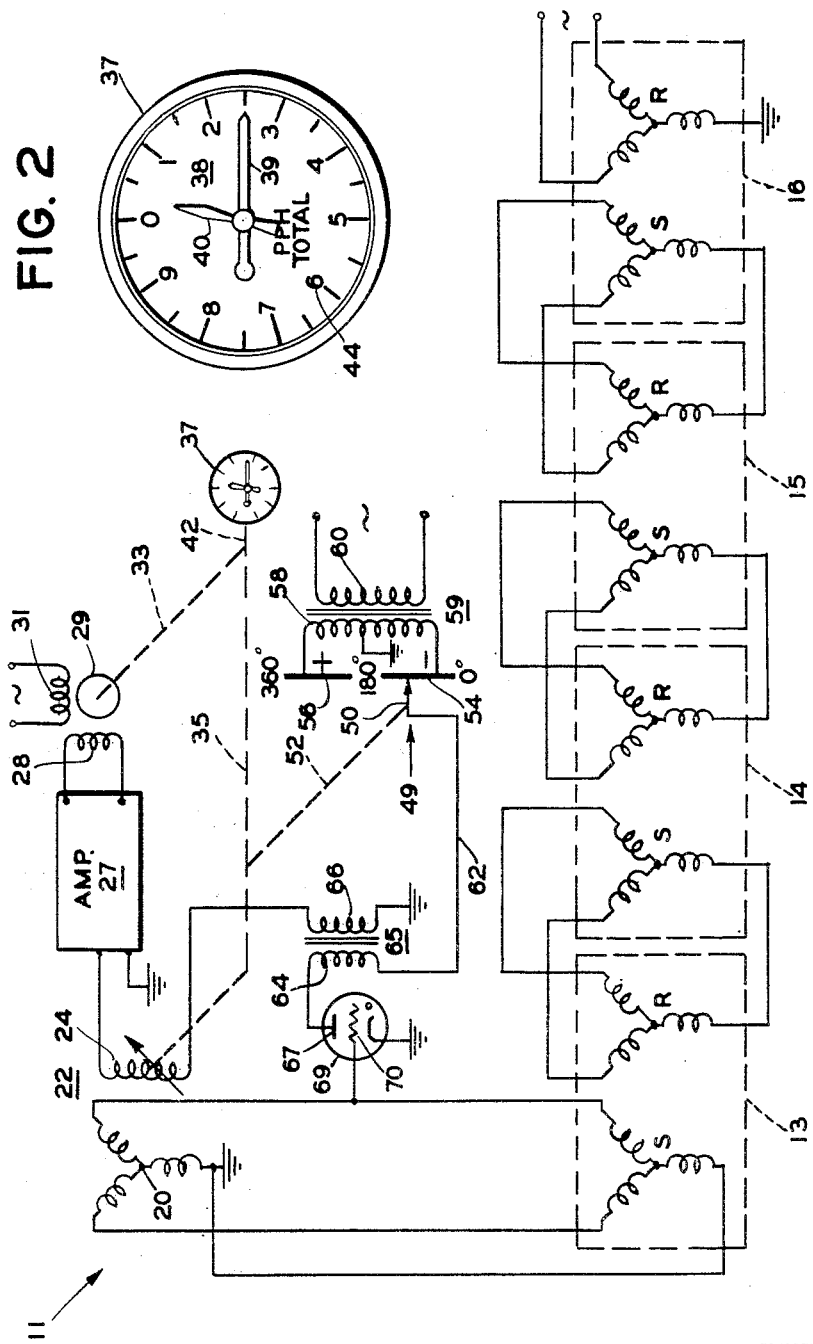
INVENTOR.
HENRY G. ELWELL JR.
BY
C. R. Miranda
ATTORNEY United States Patent Office 2,698,408
Patented Dec. 28, 1954

2,698,408

AMBIGUITY ELIMINATOR FOR FOLLOW-UP SYSTEMS

Henry G. Elwell, Jr., Hackensack, N. J., assignor to Bendix Aviation Corporation, Teterboro, N. J., a corporation of Delaware Application June 13, 1952, Serial No. 293,468

15 Claims. (Cl. 318—30)

This invention relates in general to electromechanical servo systems and more particularly to a system wherein correspondence is to be maintained between signal generators to provide accurate and controlled movement of an output member.

Systems of the above type generally employ a signal generator which produces a signal corresponding to a condition being measured, for example, and a receiver signal generator in circuit therewith which develops an error signal. A servo responsive to the error signal is drivably connected to the receiver signal generator to drive it to null to thereby decrease the error signal to zero with no change in the condition being measured. Oftentimes, the power supply of the system may be cut off while a condition is being measured, and when the power is turned on again correspondence between the two generators is destroyed. Under these conditions, ambiguities arise which render indications of the condition being measured inaccurate.

The present invention, therefore, contemplates a novel electro-mechanical servo system which provides for accurate and controlled movement of an output member. The system utilizes a transmitter signal generator which is responsive to the changes in a condition to produce a signal corresponding thereto. Connected in circuit with the transmitter is a receiver signal generator which develops an error signal to actuate a servo drivably connected thereto. The servo drives the receiver into correspondence with the transmitter thereby reducing the error signal to zero with no change in the condition being measured. Means are provided for sensing the positions of the transmitter and receiver generators and are effective for bringing the generators into correspondence when the difference therebetween is such as would cause ambiguity.

An object of the present invention, therefor, is to provide an electro-mechanical servo system wherein novel means are employed to accurately control the movement of an output member.

Another object is to provide a novel electrical system for indicating changes in a condition being measured.

A further object is to provide an indicating system wherein transmitter and receiver signal generators are employed to produce an error signal for driving a servo which, in turn, reduces the signal to zero with no change in a condition being measured and novel means are included for eliminating ambiguities in the system such as that, for example, which would occur when the transmitter and receiver signal generators are out of phase, or displaced, by an amount greater than 180 degrees.

Still another object is to provide an indicating system for sensing the angular displacements of transmitter and receiver signal generators to prevent ambiguities from arising in the system.

The above and other objects and advantages of the present invention will appear more fully hereinafter from a consideration of the detailed description which follows taken together with the accompanying drawing wherein one embodiment of the invention is illustrated.

In the drawing wherein like reference characters refer to like parts throughout both views:

Fig. 1 is a diagrammatic illustration of the indicating system of the present invention; and Fig. 2 is a front elevational view of the indicator of Fig. 1.

The present invention is illustrated herein, for purposes of explanation, as applied to a system for indicating the changes in a plurality of conditions and more specifically, as a rate of fluid flow measuring and indicating system. However, it will be apparent hereinafter to those skilled in the art that the invention, essentially, is in the means for preventing ambiguities from arising in a system which employs transmitter and receiver signal generators which normally operate in a manner to maintain correspondence therebetween. The number of transmitter signal generators is not critical since the invention operates equally well with one or more transmitters. Accordingly, reference in the specification and claims to an arrangement having a transmitter signal device or a transmitter signal generator is to be understood to include an arrangement where a single transmitter device is employed and also to include an arrangement where a plurality of transmitter devices are employed wherein the transmitter displacement is the total displacement of all the transmitter devices.

Referring now to the drawings for a more detailed description of the present invention, and more particularly to Fig. 1 wherein one embodiment hereof is clearly illustrated, a fluid flow measuring and indicating system, generally designated by the numeral 11, is shown as comprising a bank of inductive transmitter signal generators 13, 14, 15 and 16, respectively. Each transmitter signal generator comprises a displaceable three phase rotor winding R and a three phase stator winding S and the transmitters are so arranged that the stator winding of one transmitter is connected to the rotor winding of the next transmitter. The rotor winding R of generator 16 is excited from a suitable source of alternating current (not shown) while the stator winding S of generator 13 is connected back-to-back with the stator winding 20 of an inductive receiver or indicator signal generator 22 having an angularly displaceable rotor winding 24.

Rotor winding R of each transmitter is angularly displaceable relative to its respective stator winding S, and upon displacement thereof, induces a signal in its stator winding, the magnitude and phase of which depend upon the amount of displacement and direction thereof from null. Each rotor winding R is displaceable in response to a change in a condition being considered, by means not shown, it being understood that when the condition remains constant, displacement of the rotor is arrested and is maintained thereat until the condition either increases or decreases. The rotor windings R are normally biased to null by spring means (not shown) and are utilized in the present arrangement to be actuated in response to changes in the rates of fluid flow to aircraft engines, for example. Thus, where fluid flow in individual conduits is to be measured, each conduit will have associated therewith a transmitter signal generator. When no fluid flows in the conduit, the associated rotor winding will be at null and when fluid flow occurs the rotor winding will be displaced against its spring means (not shown) to induce in its stator winding a signal corresponding to the rate of fluid flow. The angular displacement of the rotor windings is limited to 90 degrees for a reason to be brought out presently.

The bank of inductive transmitter signal generators is so arranged as to provide a summation of the angular displacements of each rotor winding. The signals induced in each stator winding as a result of the displacement of their respective rotor windings are added or subtracted to effect a signal at stator winding S of transmitter 13 which corresponds to the total rate of fluid flow in the conduits. The total flow rate signal is reproduced at stator winding 20 of indicator signal generator 22 and induces in rotor winding 24 a signal voltage which represents the positional disagreement between the combined displacements of the transmitter rotor winding and winding 24, this signal being referred to hereinafter as the error signal.

Rotor winding 24 is connected to the input of a conventional torque amplifier 27, shown as a box, which has connected to its output the variable phase winding 28 of an alternating current two phase motor 29. Motor 29 has a fixed phase winding 31 constantly energized from a suitable source of alternating current and is adapted for operation by the amplified error signal in a direction and an amount depending upon the phase and magnitude of the signal. Rotor winding 24 is connected for follow-up operation by an output motor shaft 33, shown as a broken line, through a step-down gear train 35, also shown as a broken line.

It will be apparent from the foregoing, that whenever an error signal exists, motor 29 will operate in a direction to drive rotor winding 24 to a position corresponding to the total angular positions of the transmitters to thereby decrease the error signal to zero. This occurs when the total rate of fluid flow remains constant. If reduced rate of flow occurs, the signal at stator winding 20 will decrease to effect an error signal of opposite phase in rotor winding 24 which causes motor 29 to operate in an opposite direction to displace rotor winding 24 in a direction to reduce the error signal to zero. Rotor winding 24 is adapted for 360 degree rotation, and for that reason, the maximum displacement of each rotor winding R of the transmitter signal generators is 90 degrees, as pointed out hereinbefore.

The phase of the error signal at rotor winding 24 may be determined from the following:

$$E_{R1R2} = E \max. \sin(\theta - \theta^1)$$

where:

$E_{R1R2}$ is the error signal across winding 24;

$\theta$ is the total angular displacement of the rotor windings R from null; and $\theta^1$ is the angular displacement of rotor winding 24 from null.

From the foregoing, it may be seen that when the difference between $\theta$ and $\theta^1$ is less than 180 degrees, and $\theta$ is greater than $\theta^1$, the motor will be driven in one direction. Conversely, when the difference between $\theta$ and $\theta^1$ is less than 180 degrees and $\theta^1$ is greater than $\theta$, then the error signal will be of opposite phase and the motor will be driven in the opposite direction. For purposes of explanation, it will be assumed hereinafter that motor 29 is driven in a clockwise direction when the error signal is positive and in a counterclockwise direction when the error signal is negative. In the specification and claims the term "positive" or "negative" is employed simply to indicate the relative phase of the signal in question. Accordingly, when two voltages are referred to as both being of "positive" polarity or phase or as both being of "negative" polarity or phase, it is to be understood that the two voltages are in phase with each other. Similarly, when one voltage is referred to as being of "positive" polarity or phase and another voltage as being of "negative" polarity or phase, it is to be understood that such voltages are of opposite phase, that is substantially 180 degrees out of phase from each other.

In order to provide an indication of total rate of fluid flow, an indicator 37 is provided which includes a dial 38 (Fig. 2) and a relatively long pointer 39 and a short pointer 40, both of which are connected for operation by motor 29 through a gear train 42, shown as a broken line (Fig. 1). Dial 38 bears indicia 44 thereon calibrated in units of pounds per hour. The present arrangement is adapted for use with a fluid flow measuring system for indicating flow rate from zero to 80,000 pounds per hour. For this reason, pointer 39 traverses 10,000 pounds per hour for each complete revolution while pointer 40 moves 80% of a complete revolution to give a maximum indication of 80,000 pounds per hour.

The foregoing arrangement operates efficiently and accurately under normal conditions but when an abnormal condition, such as for example, deenergization of the amplifier, occurs while fluid is flowing, ambiguities arise in the system to cause inaccurate flow rate indications. To more clearly illustrate the abnormal conditions referred to, let it be assumed that there is a flow rate of 70,000 P. P. H. and for some reason amplifier 27 is deenergized, and fluid stops flowing. Under these conditions the rotor windings R are biased by their spring means (not shown) to null and pointers 39 and 40 remain at their 70,000 P. P. H. positions. Rotor winding 24 also remains in its last position which will be some amount greater than 180 degrees from the total angular transmitter position which is zero. Let it be assumed that winding 24 is 250 degrees from the transmitter's position. Suppose now, the actual fluid flow rate goes from zero to 25,000 P. P. H. and that the transmitter angular position is equivalent to 50 degrees, and further that amplifier 27 is reenergized. According to the relation set forth hereinbefore, the polarity or phase of the error signal is positive since the sine of minus (—) 200 degrees is positive. As a result, motor 29 rotates in a clockwise direction to drive pointers 39 and 40 and rotor winding 24 in the same direction. When motor 29 stops, pointers 39 and 40 will read 95,000 P. P. H., rather than the actual flow rate of 25,000 P. P. H., to effect an incorrect indication of flow.

The present invention eliminates the above operation of the system which effects inaccurate indications, by providing novel means for sensing the total angular position of the transmitter rotor windings R and the angular position of rotor winding 24; it being understood that by sensing the position of winding 24, the positions of pointers 39 and 40 are also sensed.

Coming now to a description of the novel arrangement of the present invention, the novel means referred to hereinabove comprise commutator means, generally designated by the numeral 49, which includes a rotary brush 50 coupled for rotation with motor 29 and with rotor winding 24 through a driving connection 52, shown as a broken line in Fig. 1. Commutator means 49 also includes a pair of conducting semi-circular or arcuate segments 54 and 56 arranged adjacent and behind dial 38 and separated by insulators (not shown). The segments and brush are shown schematically in Fig. 1 as straight lines and an arrow respectively, removed from dial 38, to facilitate illustration and explanation thereof. Arcuate segment 54 is engaged by brush 50 when rotor winding 24 goes from zero to just less than 180 degrees, while segment 56 is engaged by the brush when winding 24 goes from slightly more than 180 degrees to 360 degrees.

Segment 54 is connected to one end of a secondary winding 58 of a transformer 59 having a primary winding 60 connected to a source of alternating current (not shown) while segment 56 is connected to the other end of winding 58. Secondary winding 58 is connected to ground at its midpoint so that with respect to ground the voltage on segment 54 may be considered negative while the voltage on segment 56 is positive. In other words, the voltages on segments 54 and 56 are always of opposite phase, that is substantially 180 degrees out of phase.

Rotary brush 50 is connected by a lead 62 to one end of the primary winding 64 of a transformer 65 having a secondary winding 66 which has one end connected to ground and the other end connected to rotor winding 24. Primary winding 64 is connected at its other end to the plate 67 of a grid controlled gaseous discharge tube 69 frequently identified in the art as a "Thyratron". Triode 69 has a control grid 70 which has impressed thereon the flow rate signal from stator winding 20 of indicator signal generator 22. The flow rate signal, it is to be understood, varies sinusoidally with increase in total displacement of the transmitters from null, that is, the signal is of a positive polarity in the sense that it is of one phase between zero and 180 degree transmitter displacement and of a negative polarity in the sense that it is of opposite phase between 180 and 360 degree transmitter displacement. When rotor winding 24 and pointer 40 are in a position between zero and 180 degrees, it will be seen that a sensing voltage of one phase, that is, a negative voltage, is applied to plate 67 of tube 69, while an angular position of the winding and pointer between 180 and 360 degrees results in the application to the plate of a positive voltage, that is a voltage of opposite phase. Thus, it may be seen that commutator means 49 controls the phase of a high voltage to the plate of tube 69 to thereby serve as sensing means for the position of rotor winding 24 or pointer 40.

Considering now the operation of the novel sensing means of the present invention under certain operating conditions, let it be assumed that the total transmitter angular position is 90 degrees and the indicator rotor winding position is also 90 degrees, with the pointers indicating correct fluid flow. Grid 70, at this time, has applied to it a positively phased voltage while plate 67 has a negatively phased voltage so that tube 69 will not conduct. That is, the two voltages are of opposite phase, conduction of tube 69 being prevented since when the grid is positive the plate is negative and when the plate swings positive on the other half cycle the grid is negative. However, assume the same condition for the transmitters and a 290 degree position for rotor winding 24 and pointer 40; this condition may occur, as previously pointed out, when amplifier 27 becomes deenergized and then reenergized with changes in fluid flow. Without the means provided by the present invention the resultant error signal applied to amplifier 27 would be positively phased, and as a result, motor 29 would tend to drive pointers 39 and 40 in a clockwise direction to effect an erroneous fluid flow indication as previously pointed out. Motor 29, however, due to the provision of the novel means according to the present invention will be driven instead in a counterclockwise direction because now there is a positively phased voltage on both grid 70 and plate 67 which fires tube 69 to provide an output signal across secondary winding 66 which is algebraically added to the error signal and overrides the error signal. The output of tube 69, of course, is negatively phased and of greater amplitude than the error signal so that the resultant error signal applied to amplifier 27 is negatively phased and thus motor 29 returns the pointers and indicator rotor winding 24 properly to 90 degrees by going counterclockwise through the 180 degree point rather than clockwise through the 360 degree point to a false null position giving a false indication. When the rotor winding crosses 180 degrees, the "Thyratron" ceases firing since its plate voltage has assumed the opposite polarity or phase from that of the grid voltage. However, since the error signal itself becomes negative as the rotor winding crosses the 180 degree point, motor 29 will continue to operate in the counterclockwise direction to return the rotor winding and pointer 40 to the correct 90 degree position.

With this sensing arrangement, it is possible for the system to operate properly when the transmitters are, for example, at an equivalent 290 degree flow rate with the amplifier deenergized and the pointers and rotor winding 24 at zero. If the amplifier were to be reenergized, instead of the indicator rotor winding turning counterclockwise or minus (—) 70 degrees to null at 290 degrees in response to a negatively phased error signal, due to the provision of the means according to the present invention rotation will be properly clockwise instead so that rotor 24 will make the complete dial excursion to arrive at 290 degrees the long way around. This occurs because the polarity or phase of the stator voltage at 290 degrees is negative and the pointer sensing voltage is also negative, so that the two voltages are in phase causing tube 69 to fire to thereby produce an overriding signal of positive phase which is algebraically added to the error voltage of negative phase developed across rotor winding 24, whereby the motor is driven to rotate pointer 40 in a clockwise direction the correct 290 degrees.

It will now be apparent that the present invention provides novel means for preventing ambiguities from arising in a servo system when transmitting and receiving signal generators are out of phase, or displaced, by more than 180 degrees. By providing sensing means to produce an overriding signal which is algebraically added to the error voltage, proper operation of a servo may be obtained under any abnormal condition.

Although one embodiment of the present invention has been illustrated and described in detail, it is to be expressly understood that the invention is not limited thereto. Various changes can be made in the design and arrangement of the parts without departing from the spirit and scope of the invention as the same will now be understood by those skilled in the art.

I claim:

1. Means for bringing a displaceable receiver device into correspondence with a displaceable transmitter device when the relative displacement of said devices exceeds a predetermined amount, comprising driving means responsive to non-correspondence in the position of said devices for displacing said receiver device into correspondence with said transmitter device, detecting means responsive to the displacement of said receiver device for providing a signal, a gaseous discharge tube having a control grid and a plate, means connecting the output of said transmitter device to said control grid, and means connecting the signal from said detecting means to said plate, said tube being rendered conductive when the relative displacement between said devices exceeds said predetermined amount to actuate said driving means to bring said devices into correspondence.

2. In a remote control system, a transmitter signal generator for developing a signal corresponding to a condition being measured, a receiver signal generator in circuit with said transmitter signal generator and adapted to develop an error signal, means responsive to said error signal for operating said receiver signal generator to null with said transmitter signal generator so as to reduce said error signal to zero, means for sensing the position of said receiver signal generator to provide a signal, and means responsive to said first mentioned signal and said last mentioned signal for developing an auxiliary signal of greater magnitude than said error signal and substantially 180° out of phase therewith, and means for algebraically adding said auxiliary signal to said error signal.

3. In a remote control system, a transmitter signal generator for developing a signal corresponding to a condition being measured, a receiver signal generator in circuit with said transmitter signal generator and adapted to develop an error signal, means responsive to said error signal for operating said receiver signal generator to null with said transmitter signal generator so as to reduce said error signal to zero, means for sensing the position of said receiver signal generator to provide a signal, a gaseous discharge tube having a control grid and a plate, means connecting said last mentioned signal to the plate of said tube, and means connecting said first mentioned signal to said grid, said tube being rendered conductive to effect an output which is algebraically added to the error signal.

4. In an indicating system, a displaceable transmitter signal generator for developing a signal corresponding to a condition to be indicated, a displaceable receiver signal generator in circuit with said transmitter signal generator and adapted to develop an error signal, a servo responsive to said error signal for driving said receiver signal generator to reduce said error signal to zero, commutator means coupled for displacement with said receiver signal generator and adapted to sense the position of the latter to provide a signal, a gaseous discharge tube having a control grid and a plate, means connecting said first mentioned signal to said grid, means connecting said signal from the commutator means to said plate, and means for algebraically adding the output of said tube to said error signal.

5. A system according to claim 4, wherein the commutator means comprises a rotary brush and a pair of segments, one of said segments being connected to a signal source of one phase while the other segment is connected to a signal source of opposite phase, said brush being coupled for displacement with said receiver signal generator and connected to the plate of the tube.

6. In a system for indicating a condition, an inductive transmitter signal generator for developing a signal corresponding to said condition, an inductive receiver signal generator having a fixed stator winding in circuit with said transmitter signal generator and a movable rotor winding, said receiver signal generator adapted to develop in said rotor winding an error signal, a servo responsive to said error signal for driving said rotor winding to reduce said error signal to zero, commutator means comprising a rotary brush and a pair of conducting segments, said brush being coupled for movement with said rotor winding and adapted to contact said segments, means for connecting one of said segments to a signal source of one phase and the other segment to a signal source of one phase and the other segment to a signal source of opposite phase, a gaseous discharge tube having a control grid and a plate, means connecting said brush to said plate to impress a signal thereon, means connecting the first mentioned signal to the grid of said tube whereby the tube is rendered conductive to effect an output when said first mentioned signal and the signal from said brush are in phase, and means connecting the output of said tube to said rotor winding to be algebraically added to said error signal.

7. In combination, an angularly displaceable transmitter device for providing a control signal, an angularly displaceable receiver device connected to receive said control signal to produce an output signal, a motor responsive to the output signal of the receiver device and connected to displace the receiver device normally to maintain positional agreement between said dvices, the output signal of the receiver device tending to operate the motor in one direction for one phase of said output signal when positional disagreement between said devices exceeds one-hundred-eighty degrees, and means operative when the devices are in positional disagreement by an amount exceeding one-hundred-eighty degrees to assume primary control of the motor to operate the latter in a reverse direction for said one phase of said output signal.

8. In combination, an angularly displaceable transmitter device for providing a control signal, an angularly displaceable receiver device connected to receive said control signal to produce an output signal, a motor responsive to the output signal of the receiver device and connected to displace the receiver device, the output signal of the receiver device tending to operate the motor in one direction for a given phase of said output signal when positional disagreement between said devices exceeds one-hundred-eighty degrees, means operative when the devices are in positional disagreement by an amount exceeding one-hundred-eighty degrees to assume primary control of the motor to operate the latter in a reverse direction for said given phase of said output signal to reduce the positional disagreement of said devices to an amount less than one-hundred-eighty degrees, and means operative when the positional disagreement between said devices has been reduced to an amount less than one-hundred-eighty degrees whereby the output signal of said receiver device assumes primary control of said motor to establish positional agreement between said devices.

9. Means for bringing a displaceable receiver signal device into correspondence with a displaceable transmitter signal device when the relative displacement of said devices exceeds a predetermined amount, comprising driving means responsive to non-correspondence in the position of said devices for displacing said receiver device, detecting means responsive to the displacement of said receiver device for providing a signal, and means in circuit with the output of said transmitter device and said detecting means for comparing said signal with the signal from said transmitter device and producing an output when the relative displacement between said devices exceeds said predetermined amount to control the operation of said driving means so that said driving means brings said devices into correspondence.

10. In a remote control system, a transmitter signal generator for developing a signal corresponding to a condition being measured, a receiver signal generator in circuit with said transmitter signal generator and adapted to develop an error signal, means responsive to said error signal for operating said receiver signal generator to null with said transmitter signal generator so as to reduce said error signal to zero, and means in circuit with said transmitter and receiver signal generators for developing, when the relative displacement between said generators exceeds a predetermined amount, an auxiliary signal of greater magnitude than said error signal and substantially 180° out of phase therewith, and means for combining said auxiliary signal with said error signal to produce a resultant signal substantially 180° out of phase with said error signal for controlling said receiver operating means.

11. In a remote control system, a transmitter signal generator for developing a signal corresponding to a condition being measured, a receiver signal generator in circuit with said transmitter signal generator and adapted to develop an error signal, a servo responsive to said error signal for driving said receiver signal generator to reduce said error signal to zero, and means responsive to the first mentioned signal and said error signal for developing, when the relative displacement between said generators exceeds a predetermined amount, an auxiliary signal having a greater magnitude than said error signal and substantially 180° out of phase therewith, and means for algebraically adding said auxiliary signal to said error signal.

12. In a remote control system, a transmitter signal generator for developing a signal corresponding to a condition being measured, a receiver signal generator in circuit with said transmitter signal generator and adapted to develop an error signal, means responsive to said error signal for operating said receiver signal generator to null with said transmitter signal generator so as to reduce said error signal to zero, means for sensing the position of said receiver signal generator to provide a signal, a gaseous discharge tube having a control grid and a plate, means connecting said last mentioned signal to the plate of said tube, and means connecting said first mentioned signal to said grid so that when said first mentioned signal and said last mentioned signal have a predetermined phase relationship said tube is rendered conductive to effect an output signal of a magnitude greater than the magnitude of said error signal and substantially 180° out of phase therewith, and means for algebraically adding the output signal from said tube to the error signal to override said error signal.

13. In a system for indicating a condition, an inductive transmitter signal generator for developing a signal corresponding to said condition, an inductive receiver signal generator having a fixed stator winding in circuit with said transmitter signal generator and a movable rotor winding, said receiver signal generator adapted to develop in said rotor winding an error signal, a servo responsive to said error signal for driving said rotor winding to reduce said error signal to zero, commutator means comprising a rotary brush and a pair of conducting segments, said brush being coupled for movement with said rotor winding and adapted to contact one of said segments depending upon the rotary position of said rotary winding, means for connecting one of said segments to a signal source of one phase and the other segment to a signal source of opposite phase, a gaseous discharge tube having a control grid and a plate, means connecting said brush to said plate to impress a signal thereon of a phase depending upon which segment said brush is in contact with at the time, means for applying the first mentioned signal to the grid of said tube whereby the tube is rendered conductive to effect an output when said first mentioned signal and the signal from said brush are substantially in phase, and means connecting the output of said tube to said rotor winding to be algebraically added to said error signal.

14. In combination, a displaceable transmitter device for providing a control signal, a displaceable receiver device connected to receive said control signal to develop an output signal, driving means responsive to the output signal of the receiver device to displace the receiver device, the output signal of the receiver device when the positional disagreement between said device is a predetermined amount tending to operate said driving means and said receiver device in one direction for one phase of said output signal so that said receiver device approaches a false null position which is out of true agreement with said transmitter device and which is closer than the null position of true agreement, and means operative when the positional disagreement between said devices is said predetermined amount to assume primary control of the driving means to move the latter and said receiver in a direction which is opposite to said first mentioned direction for said one phase of said output signal, whereby said receiver device approaches the position of true agreement without traversing the false null position.

15. In combination, a displaceable transmitter device for providing a control signal, a displaceable receiver device connected to receive said control signal to produce an output signal, driving means normally responsive to the output signal of the receiver device to move the receiver device into positional agreement with the transmitter device, said output signal tending to move said driving means and said receiver in one direction when the positional disagreement between said devices exceeds a predetermined amount, means operative when the positional disagreement between said devices exceeds said predetermined amount to produce a signal having a magnitude greater than the magnitude of said output signal and substantially 180° out of phase therewith, and means for combining said auxiliary signal with said output signal to produce a resultant signal which moves said driving means and said receiver device in a reverse direction.

References Cited in the file of this patent

UNITED STATES PATENTS

| Number | Name | Date |
|---|---|---|
| 2,356,186 | Somers | Aug. 22, 1944 |
| 2,442,069 | Ballard | May 25, 1948 |
| 2,478,221 | Alford et al. | Aug. 9, 1949 |
| 2,537,083 | Peoples, Jr. | Jan. 9, 1951 |
| 2,582,221 | Belsey et al. | Jan. 15, 1952 |